United States Patent
Horn et al.

(10) Patent No.: US 8,237,962 B2
(45) Date of Patent: Aug. 7, 2012

(54) THROUGHPUT ESTIMATE BASED UPON DOCUMENT COMPLEXITY ANALYSIS

(75) Inventors: Richard T. Horn, Claremont, CA (US); Lynn Kirby-Mello, Pasadena, CA (US)

(73) Assignee: Xerox Corporation, Norwalk, CT (US)

( * ) Notice: Subject to any disclaimer, the term of this patent is extended or adjusted under 35 U.S.C. 154(b) by 883 days.

(21) Appl. No.: 12/331,488

(22) Filed: Dec. 10, 2008

(65) Prior Publication Data

US 2010/0141984 A1 Jun. 10, 2010

(51) Int. Cl.
*G06F 3/12* (2006.01)
*G06K 15/00* (2006.01)
*H04N 1/40* (2006.01)
*G03B 27/52* (2006.01)

(52) U.S. Cl. ...... 358/1.15; 358/1.18; 358/2.1; 358/3.23; 355/23; 355/24; 355/25

(58) Field of Classification Search ................. 358/1.15, 358/1.6, 1.9, 1.18, 3.24, 3.23, 2.1, 501; 101/171, 101/468; 355/24, 25, 23, 78, 88, 114
See application file for complete search history.

(56) References Cited

U.S. PATENT DOCUMENTS

| | | | |
|---|---|---|---|
| 6,032,004 A | 2/2000 | Mirabella, Jr. et al. | |
| 6,100,998 A | 8/2000 | Nagao et al. | |
| 6,219,149 B1 | 4/2001 | Kawata et al. | |
| 6,618,167 B1 | 9/2003 | Shah | |
| 7,161,705 B2 | 1/2007 | Klassen | |
| 2003/0095694 A1 | 5/2003 | Dinstein et al. | |
| 2004/0085558 A1 | 5/2004 | Minns et al. | |
| 2005/0190383 A1* | 9/2005 | Levin et al. | 358/1.1 |

* cited by examiner

*Primary Examiner* — Benny Q Tieu
*Assistant Examiner* — Ngon Nguyen
(74) *Attorney, Agent, or Firm* — Gibb & Riley, LLC

(57) ABSTRACT

A method receives a print job and analyzes the complexity of the print job to generate complexity factors. The method performs raster image processing (RIP) on the print job and records the time taken to perform the raster image processing of each page of the print job. This generates "RIP times." In addition, the method records the size of each page of the print job to generate "page sizes." Then the method prints the print job and records the time it took to process the print job. Then the method determines how each of the complexity factors, the RIP times, and the page sizes contributed to the time it took to process the print job. This generates "complexity factor time values." The method prints a report of the complexity factor time values detailing how each of the complexity factors contributed to the time it took to process the print job.

18 Claims, 4 Drawing Sheets

300 → THROUGHPUT REPORT

302 → TOTAL PRINT JOB TIME: 11.6 MIN

BREAKDOWN:

304 → RIP ANALYSIS:
AVERAGE PAGE SIZE: 50 KB
AVERAGE RIP PAGE TIME: 3.3 SEC.

306 → COMPLEXITY FACTORS:
PAPER MEDIA CHANGES: 3 MIN
SIMPLEX/DUPLEX CHANGES: 1 MIN
12 FONTS CALLED: 0.5 MIN
22 FONT CHANGES: 1.1 MIN
22 GRAPHICAL OBJECTS, AVERAGE SIZE 20 KB: 2.4 MIN
8 TIFF DIGITIZED IMAGES, AVERAGE SIZE 5 KB: 3.6 MIN

FIG. 3

THROUGHPUT ESTIMATE BASED UPON DOCUMENT COMPLEXITY ANALYSIS

BACKGROUND AND SUMMARY

Embodiments herein generally relate to electrostatographic printers and copiers or reproduction machines, and more particularly, concerns a method that uses complexity factor time values to detail how each of the complexity factors contributed to the time it took to process the print job.

One embodiment herein comprises a method that receives a print job and analyzes the complexity of the print job to generate complexity factors. For example, the method can provide the user with an input choice that determines whether to perform the print job analysis of the embodiments herein. The analyzing of the print job comprises examining the print job for items such as: paper media changes; simplex/duplex changes; number of fonts called; number of fonts changed; and number and size of graphical objects, number, size, and type of digitized images, etc.

The method performs raster image processing (RIP) on the print job and records the time taken to perform the raster image processing of each page of the print job. This generates "RIP times." In addition, the method records the size of each page of the print job to generate "page sizes."

Then, the method prints the print job and records the time it took to process the print job. The method determines how each of the complexity factors, the RIP times, and the page sizes contributed to the time it took to process the print job. This generates "complexity factor time values." The method prints a report of the complexity factor time values detailing how each of the complexity factors contributed to the time it took to process the print job.

In addition, the method can maintain the complexity factor time values within at least one forecast table. This allows embodiments herein to forecast a specific time that it will take to process a specific print job having specific complexity factors. This forecasting is based on the complexity factor time values within the forecast table.

In addition to method embodiments, this disclosure also presents apparatus embodiments. One such apparatus embodiment is a printing apparatus that includes a processor within the printing apparatus. The apparatus also includes a computer-readable storage medium operatively connected to the processor. The computer-readable storage medium stores instructions executable by the processor to allow the processor to control the apparatus operations and perform the analysis discussed herein. Further, the apparatus includes at least one input/output operatively connected to the processor. The input/output receives a print job and the processor analyzes the complexity of the print job to generate complexity factors. The input/output can comprise a user input to determine whether to perform the analysis herein.

The processor also performs raster image processing of the print job. The processor records the time taken to perform the raster image processing of each page of the print job to the generate RIP times. In addition, the processor records the size of each page of the print job to generate page sizes.

A printing engine is included within the apparatus to print the print job. The processor records the time it took to process the print job and determines how each of the complexity factors, the RIP times, and the page sizes contributed to the time to process the print job. This generates the complexity factor time values. When analyzing the print job, the processor examines the print job for items such as: paper media changes; simplex/duplex changes; number of fonts called; number of fonts changed; and number and size of graphical objects, number, size, and type of digitized images. The printing engine can then output (print) a report for the user along with the print job. The report lists of the complexity factor time values detailing how each of the complexity factors contributed to the time to process the print job.

Further, the processor can maintain the complexity factor time values within at least one forecast table. This allows the processor to forecast a specific time that it will take to process a specific print job having specific complexity factors. This forecast is based on the complexity factor time values within the forecast table.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIG. 3 is a schematic diagram of a throughput report according to embodiments herein.

DETAILED DESCRIPTION

Figure 1:
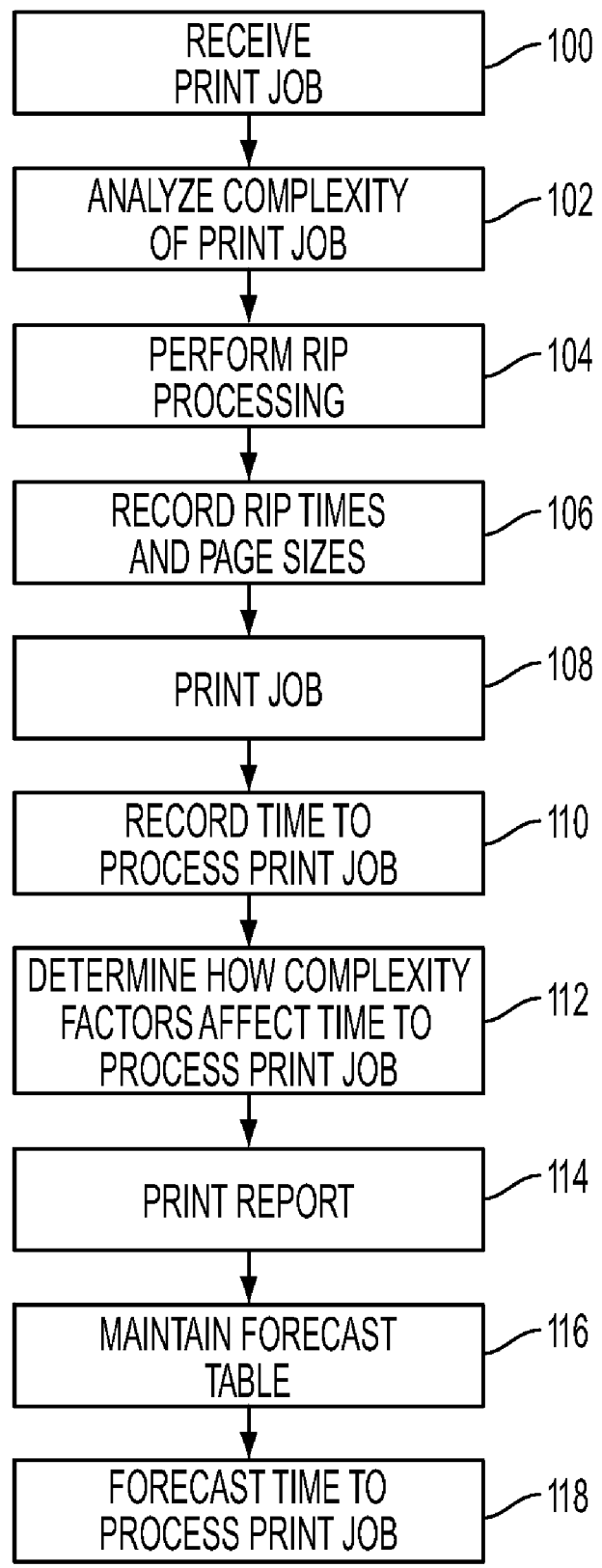
FIG. 1 is a flowchart illustrating method embodiments herein.

One method embodiment herein is shown in flowchart form in FIG. 1. More specifically, in item 100, the method receives a print job. The method can provide the user with an input choice that determines whether to perform the print job analysis of the embodiments herein.

In item 102, the method analyzes the complexity of the print job to generate complexity factors. The analyzing of the print job performed in item 102 comprises examining the print job for items such as: paper media changes; simplex/duplex changes; number of fonts called; number of fonts changed; and number and size of graphical objects, number, size, and type of digitized images, etc.

In item 104, the method performs raster image processing (RIP) on the print job. The method records the time taken to perform the raster image processing of each page of the print job in item 106. This generates "RIP times." In addition, in item 106 the method also records the size of each page of the print job to generate "page sizes."

Then, in item 108, the method prints the print job. In item 110, the method records the time it took to process the print job. Then, in item 112, the method determines how each of the complexity factors, the RIP times, and the page sizes contributed to the time it took to process the print job. This generates "complexity factor time values."

In item 114, the method prints a report of the complexity factor time values detailing how each of the complexity factors contributed to the time it took to process the print job.

In addition, in item 116, the method can maintain the complexity factor time values within at least one forecast table. This allows embodiments herein to forecast the specific time that it will take to process a specific print job having specific complexity factors, as shown in item 118. This forecasting is based on the complexity factor time values within the forecast table.

Many systems are available that enhance printing efficiency. For example, see U.S. Pat. Nos. 7,161,705; 6,618,167; 6,219,149 and 6,100,998, the complete disclosures of which are fully incorporated herein. While previous systems can estimate how long it will take to rasterized or interpret a print job and can find the most efficient way to handle different print jobs, the embodiments herein work to change the manner in which the user creates the print jobs. The embodiments herein break out various complexity factors and provide the user specific feedback on each of the complexity factors to allow the user to tailor future print jobs to decrease processing time and increase throughput. Some conventional systems have identified some complexity factors in the past (U.S. Patent Publications 2004/0085558 and 2003/0095694, fully incorporated herein by reference); however, conventional systems do not communicate such factors to the user to provide the user with concepts of which factors contribute to print job processing time. To the contrary, the embodiments herein provide the user with extensive information that was not previously available to allow the user to make better choices when creating the print jobs to increase throughput.

While conventional systems focus on the most efficient manner to process a given print job, the present embodiments break away from such teachings and actually motivate the user to change the way they create print jobs to reduce the amount of time needed to process the print job. With embodiments herein, users are trained over time as to which of the complexity factors are causing the print jobs to take excessive processing time, which allows the users to reduce or eliminate such complexity factors from future print jobs. In other words, rather than focusing efforts on different combinations of processing techniques for certain types of print jobs, the present embodiments focus on the source of the problem-the user that creates the print jobs. By focusing on techniques that can train the users to create print jobs that are processed more quickly, the present embodiments attain substantial improvements in efficiency and print job throughput.

Figure 2:
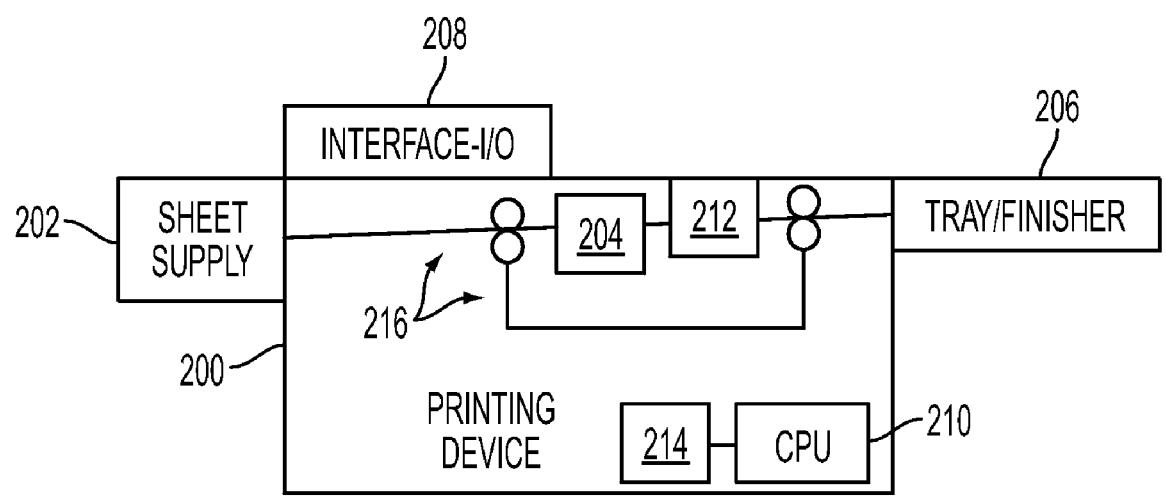
FIG. 2 is a schematic diagram of a printing apparatus according to embodiments herein.
Figure 4:
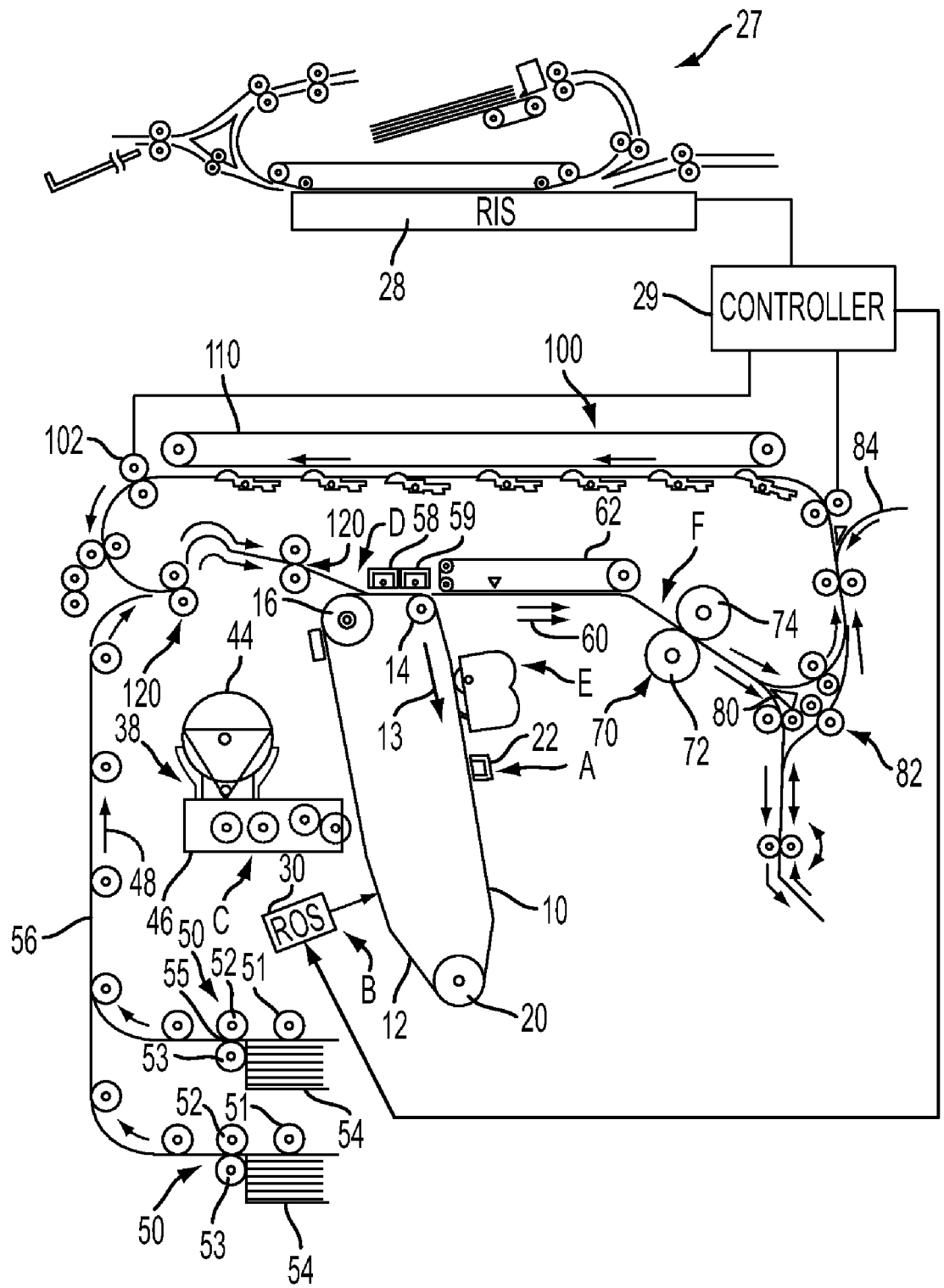
FIG. 4 is a schematic diagram of a printing apparatus according to embodiments herein.

In addition to method embodiments, this disclosure also presents apparatus embodiments. One such apparatus embodiment is illustrated in FIGS. 2 and 4. More specifically, FIG. 2 illustrate a printing apparatus 200 that includes a processor 210 within the printing apparatus 200. The apparatus 200 also includes a computer-readable storage medium 214 operatively connected to the processor 210. The computer-readable storage medium 214 stores instructions executable by the processor 210 to allow the processor 210 to control the apparatus 200 operations and perform the analysis discussed herein.

Further, the apparatus 200 includes at least one interface and/or input/output 208 operatively connected to the processor 210. The input/output 208 can comprise a wired or wireless network connection, a graphic user interface, a document input tray, a raster image scanner, or any other form of data input/output. The input/output 208 receives a print job and the processor 210 analyzes the complexity of the print job to generate complexity factors. The input/output 208 can, for example, receive user input indicative of whether the user desires to perform the analysis herein.

The processor 210 also performs raster image processing of the print job. The processor 210 records the time taken to perform the raster image processing of each page of the print job to the generate RIP times. In addition, the processor 210 records the size of each page of the print job to generate page sizes. Both of these items can be stored in, for example, the computer-readable storage medium 214.

One or more printing engine(s) 204/212 can be included within the apparatus 200 to print the print job. For example, sheets can be supplied from a sheet supply 202, and fed along a paper path 216 through the printing engine(s) 204/212 to place markings on the sheets. The sheets can then be returned along the paper path 216 for additional printing (multi-color or simplex/duplex). Finally, the sheets are output to some form of user accessible region such as an output tray, sorter, finisher 206, etc.

The processor 210 records the time it took to process the print job and determines how each of the complexity factors, the RIP times, and the page sizes contributed to the time to process the print job. This generates the complexity factor time values. When analyzing the print job, the processor 210 examines the print job for items such as: paper media changes; simplex/duplex changes; number of fonts called; number of fonts changed; and number and size of graphical objects, number, size, and type of digitized images. The printing engine can then output (print) a report for the user along with the print job. The report lists of the complexity factor time values detailing how each of the complexity factors contributed to the time to process the print job.

One exemplary report 300 is shown in FIG. 3. More specifically, FIG. 3 illustrates the total print job time 302, a RIP analysis 304, and a breakdown of the complexity factors 306. The report 300 specifies how each different complexity factor contributed to the overall print job time.

Further, the processor 210 can maintain the complexity factor time values within at least one forecast table (maintained, for example, within the computer-readable storage medium 214). This allows the processor 210 to forecast a specific time that it will take to process a specific print job having specific complexity factors. This forecast can be based at least in part on the complexity factor time values within the forecast table.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as International Business Machines Corporation, Armonk N.Y., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., and the details of such devices are not discussed herein for purposes of brevity and reader focus.

The word "printer" or "image output terminal" as used herein encompasses any apparatus, such as a digital copier, bookmaking machine, facsimile machine, multi-function machine, etc. which performs a print outputting function for any purpose. The embodiments herein specifically applied to electrostatic and xerographic devices. The details of printers, printing engines, etc. are well-known by those ordinarily skilled in the art and are discussed in, for example, U.S. Pat. No. 6,032,004, the complete disclosure of which is fully incorporated herein by reference.

For example, FIG. 4 schematically depicts an electrophotographic printing machine that is similar to one described in U.S. Pat. No. 6,032,004. It will become evident from the following discussion that the present embodiments may be employed in a wide variety of devices and is not specifically limited in its application to the particular embodiment depicted in FIG. 4. Referring to FIG. 4, an original document is positioned in a document handler 27 on a raster input scanner (RIS) indicated generally by reference numeral 28. The RIS contains document illumination lamps, optics, a mechanical scanning drive and a charge coupled device (CCD) array. The RIS captures the entire original document and converts it to a series of raster scan lines. This information is transmitted to an electronic subsystem (ESS) which controls a raster output scanner (ROS) described below.

FIG. 4 schematically illustrates an electrophotographic printing machine which generally employs a photoconductive belt 10. The photoconductive belt 10 can be made from a photoconductive material coated on a ground layer, which, in turn, can be coated on an anti-curl backing layer. Belt 10 moves in the direction of arrow 13 to advance successive portions sequentially through the various processing stations disposed about the path of movement thereof. Belt 10 can be entrained about stripping roller 14, tensioning roller 16 and drive roller 20. As roller 20 rotates, it advances belt 10 in the direction of arrow 13. Tensioning roller 16 is designed according to equation (2), can be biased, and provides the same motion control that is discussed above with respect to rollers 103 and 310.

Initially, a portion of the photoconductive surface passes through charging station A. At charging station A, a corona generating device indicated generally by the reference numeral 22 charges the photoconductive belt 10 to a relatively high, substantially uniform potential.

At an exposure station, B, a controller or electronic subsystem (ESS), indicated generally by reference numeral 29, receives the image signals representing the desired output image and processes these signals to convert them to a continuous tone or greyscale rendition of the image which can be transmitted to a modulated output generator, for example the raster output scanner (ROS), indicated generally by reference numeral 30. The ESS 29 can be a self-contained, dedicated minicomputer. The image signals transmitted to ESS 29 may originate from a RIS as described above or from a computer, thereby enabling the electrophotographic printing machine to serve as a remotely located printer for one or more computers.

Alternatively, the printer may serve as a dedicated printer for a high-speed computer. The signals from ESS 29, corresponding to the continuous tone image desired to be reproduced by the printing machine, are transmitted to ROS 30. ROS 30 includes a laser with rotating polygon mirror blocks. The ROS will expose the photoconductive belt to record an electrostatic latent image thereon corresponding to the continuous tone image received from ESS 29. As an alternative, ROS 30 may employ a linear array of light emitting diodes (LEDs) arranged to illuminate the charged portion of photoconductive belt 10 on a raster-by-raster basis.

After the electrostatic latent image has been recorded on photoconductive surface 12, belt 10 advances the latent image to a development station, C, where toner, in the form of liquid or dry particles, is electrostatically attracted to the latent image using commonly known techniques. The latent image attracts toner particles from the carrier granules forming a toner powder image thereon. As successive electrostatic latent images are developed, toner particles are depleted from the developer material. A toner particle dispenser, indicated generally by the reference numeral 44, dispenses toner particles into developer housing 46 of developer unit 38.

With continued reference to FIG. 4, after the electrostatic latent image is developed, the toner powder image present on belt 10 advances to transfer station D. A print sheet 48 can be advanced to the transfer station, D, by a sheet feeding apparatus, 50. The sheet feeding apparatus 50 includes a nudger roll 51 which feeds the uppermost sheet of stack 54 to nip 55 formed by feed roll 52 and retard roll 53. Feed roll 52 rotates to advance the sheet from stack 54 into vertical transport 56. Vertical transport 56 directs the advancing sheet 48 of support material into the registration transport 120 of the invention herein, described in detail below, past image transfer station D to receive an image from photoreceptor belt 10 in a timed sequence so that the toner powder image formed thereon contacts the advancing sheet 48 at transfer station D.

Transfer station D includes a corona generating device 58 which sprays ions onto the back side of sheet 48. This attracts the toner powder image from photoconductive surface 12 to sheet 48. The sheet is then detacked from the photoreceptor by corona generating device 59 which sprays oppositely charged ions onto the back side of sheet 48 to assist in removing the sheet from the photoreceptor. After transfer, sheet 48 continues to move in the direction of arrow 60 by way of belt transport 62 which advances sheet 48 to fusing station F.

Fusing station F includes a fuser assembly indicated generally by the reference numeral 70 which permanently affixes the transferred toner powder image to the copy sheet. The fuser assembly 70 includes a heated fuser roller 72 and a pressure roller 74 with the powder image on the copy sheet contacting fuser roller 72. The pressure roller is cammed against the fuser roller to provide the necessary pressure to fix the toner powder image to the copy sheet. The fuser roll can be internally heated by a quartz lamp (not shown). Release agent, stored in a reservoir (not shown), can be pumped to a metering roll (not shown). A trim blade (not shown) trims off the excess release agent. The release agent transfers to a donor roll (not shown) and then to the fuser roll 72.

The sheet then passes through fuser 70 where the image is permanently fixed or fused to the sheet. After passing through fuser 70, a gate 80 either allows the sheet to move directly via output 84 to a finisher or stacker, or deflects the sheet into the duplex path 100, specifically, first into single sheet inverter 82 here. That is, if the sheet is either a simplex sheet, or a completed duplex sheet having both side one and side two images formed thereon, the sheet will be conveyed via gate 80 directly to output 84. However, if the sheet is being duplexed and is then only printed with a side one image, the gate 80 will be positioned to deflect that sheet into the inverter 82 and into the duplex loop path 100, where that sheet will be inverted and then fed to acceleration nip 102 and belt transports 110, for recirculation back through transfer station D and fuser 70 for receiving and permanently fixing the side two image to the backside of that duplex sheet, before it exits via exit path 84.

After the print sheet is separated from photoconductive surface 12 of belt 10, the residual toner/developer and paper fiber particles adhering to photoconductive surface 12 are removed therefrom at cleaning station E. Cleaning station E includes a rotatably mounted fibrous brush in contact with photoconductive surface 12 to disturb and remove paper fibers and a cleaning blade to remove the nontransferred toner particles. The blade may be configured in either a wiper or doctor position depending on the application. Subsequent to cleaning, a discharge lamp (not shown) floods photoconductive surface 12 with light to dissipate any residual electrostatic charge remaining thereon prior to the charging thereof for the next successive imaging cycle.

The various machine functions are regulated by controller 29. The controller 29 can be a programmable microprocessor which controls all machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

While conventional systems focus on the most efficient manner to process a given print job, the present embodiments break away from such teachings and actually motivate the user to change the way they create print jobs to reduce the amount of time needed to process the print job. With embodiments herein, users are trained over time as to which of the complexity factors are causing the print jobs to take excessive processing time, which allows the users to reduce or eliminate such complexity factors from future print jobs. In other words, rather than focusing efforts on different combinations of processing techniques for certain types of print jobs, the present embodiments focus on the source of the problem-the user that creates the print jobs. By focusing on techniques that can train the users to create print jobs that are processed more quickly, the present embodiments attain substantial improvements in efficiency and print job throughput.

All foregoing embodiments are specifically applicable to electrostatographic and/or xerographic machines and/or processes. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

What is claimed is:

1. A method comprising:
   receiving a print job at a printer;
   analyzing a complexity of said print job to generate complexity factors;
   printing said print job using said printer;
   recording a time to process said print job;
   determining how each of said complexity factors contributed to said time to process said print job to generate complexity factor time values; and
   printing a report of said complexity factor time values detailing how each of said complexity factors contributed to said time to process said print job,
   said analyzing of said complexity of said print job comprising examining said print job for at least one of: paper media changes; simplex/duplex changes; number of fonts called; number of fonts changed; and number and size of graphical objects, number, size, and type of digitized images.

2. The method according to claim 1, further comprising maintaining said complexity factor time values within at least one forecast table.

3. The method according to claim 2, further comprising forecasting a specific time to process a specific print job having specific complexity factors based on said complexity factor time values within said forecast table.

4. The method according to claim 1, further comprising providing a user input to perform said analyzing.

5. A method comprising:
   receiving a print job at a printer;
   analyzing a complexity of said print job to generate complexity factors;
   raster image processing said print job using said printer;
   recording a time to perform a raster image process (RIP) of each page of said print job to generate RIP times;
   recording a size of each said page of said print job to generate page sizes;
   printing said print job;
   recording a time to process said print job;
   determining how each of said complexity factors, said RIP times, and said page sizes contributed to said time to process said print job to generate complexity factor time values; and
   printing a report of said complexity factor time values detailing how each of said complexity factors contributed to said time to process said print job.

6. The method according to claim 5, said analyzing of said print job comprising examining said print job for at least one of: paper media changes; simplex/duplex changes; number of fonts called; number of fonts changed; and number and size of graphical objects, number, size, and type of digitized images.

7. The method according to claim 5, further comprising maintaining said complexity factor time values within at least one forecast table.

8. The method according to claim 7, further comprising forecasting a specific time to process a specific print job having specific complexity factors based on said complexity factor time values within said forecast table.

9. The method according to claim 5, further comprising providing a user input to perform said analyzing.

10. A printing apparatus comprising:
    a processor within said printing apparatus;
    a computer-readable storage medium operatively connected to said processor, said computer-readable storage medium storing instructions executable by said processor;
    an input/output operatively connected to said processor, said input/output receiving a print job; and
    a printing engine operatively connected to said processor, said printing engine printing said print job,
    said processor recording a time to process said print job; and determining how each of said complexity factors, said RIP times, and said page sizes contributed to said time to process said print job to generate complexity factor time values,
    said printing engine printing a report of said complexity factor time values detailing how each of said complexity factors contributed to said time to process said print job, and
    said processor examining said print job for at least one of: paper media changes; simplex/duplex changes; number of fonts called; number of fonts changed; and number and size of graphical objects, number, size, and type of digitized images.

11. The printing apparatus according to claim 10, said processor maintaining said complexity factor time values within at least one forecast table.

12. The printing apparatus according to claim 11, said processor forecasting a specific time to process a specific print job having specific complexity factors based on said complexity factor time values within said forecast table.

13. The printing apparatus according to claim 10, said input/output comprising a user input to perform said analyzing.

14. A printing apparatus comprising:
    a processor within said printing apparatus;
    a computer-readable storage medium operatively connected to said processor, said computer-readable storage medium storing instructions executable by said processor;
    an input/output operatively connected to said processor, said input/output receiving a print job; and a printing engine operatively connected to said processor, said processor: analyzing a complexity of said print job to generate complexity factors; raster image processing said print job; recording a time to perform a raster image process (RIP) of each page of said print job to generate RIP times; and recording a size of each said page of said print job to generate page sizes;

said printing engine printing said print job, said processor recording a time to process said print job; and determining how each of said complexity factors, said RIP times, and said page sizes contributed to said time to process said print job to generate complexity factor time values, and said printing engine printing a report of said complexity factor time values detailing how each of said complexity factors contributed to said time to process said print job.

15. The printing apparatus according to claim 14, said processor examining said print job for at least one of: paper media changes; simplex/duplex changes; number of fonts called; number of fonts changed; and number and size of graphical objects, number, size, and type of digitized images.

16. The printing apparatus according to claim 14, said processor maintaining said complexity factor time values within at least one forecast table.

17. The printing apparatus according to claim 16, said processor forecasting a specific time to process a specific print job having specific complexity factors based on said complexity factor time values within said forecast table.

18. A non-transitory computer-readable storage medium storing instructions that, when executed by a computer, cause the computer to:

receive a print job;

analyze a complexity of said print job to generate complexity factors;

print said print job;

record a time to process said print job;

determine how each of said complexity factors contributed to said time to process said print job to generate complexity factor time values; and print a report of said complexity factor time values detailing how each of said complexity factors contributed to said time to process said print job, said analyzing of said complexity of said print job comprising examining said print job for at least one of: paper media changes; simplex/duplex changes; number of fonts called; number of fonts changed; and number and size of graphical objects, number, size, and type of digitized images.

\* \* \* \* \*